Sept. 10, 1968  R. S. LANCTOT  3,400,590
VECTOR SENSOR
Filed Dec. 16, 1966
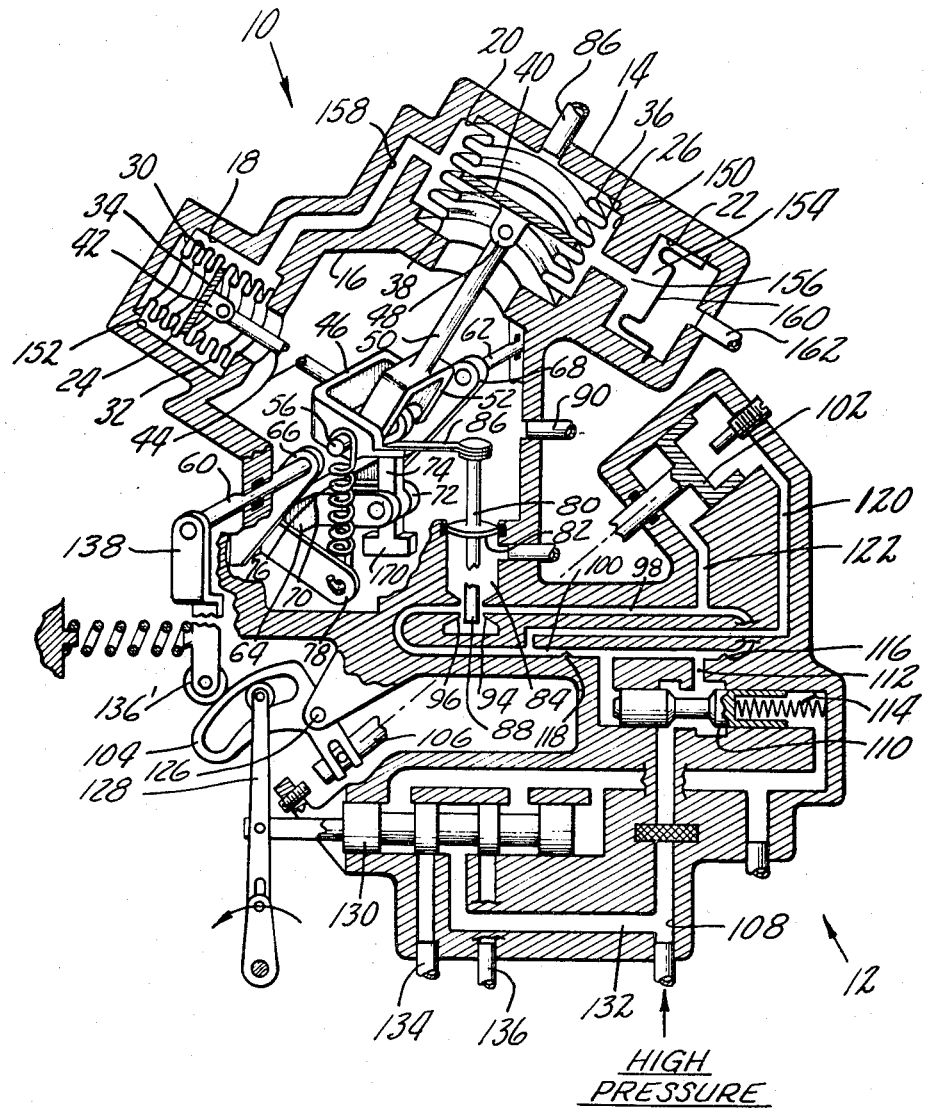
INVENTOR
ROBERT S. LANCTOT
BY *Norman Friedland*
ATTORNEY United States Patent Office 3,400,590
Patented Sept. 10, 1968

3,400,590
VECTOR SENSOR
Robert S. Lanctot, Longmeadow, Mass., assignor to
United Aircraft Corporation, East Hartford, Conn.,
a corporation of Delaware
Filed Dec. 16, 1966, Ser. No. 602,382
3 Claims. (Cl. 73—410)

ABSTRACT OF THE DISCLOSURE

A vector ratio sensor utilizing bellows disposed in cavities interconnected by passages sealed in a housing containing the vector linkages and separated therefrom. The cavities and passages are completely filled with a dampening fluid. A biasing element closes off one end of the passage and responds to temperature changes to assure that the fluid completely fills the passages and the volume changes are compensated thereby. The linkages have been constructed with a weight on one element to counteract inertial effects of the linkages to acceleration.

---

This invention relates to sensors and particularly to vector type of ratio sensing mechanism.

Vector ratio sensors are well known in the art as is exemplified by the one illustrated in Patent No. 3,162,047, granted to A. G. Rosenberger on Dec. 22, 1964.

This invention constitutes an improvement over the one disclosed in the Rosenberger patent, supra, insofar as it solves several problems associated with aircraft applications which are neither shown nor suggested in the prior art. A vector sensing device may be briefly described as a device which senses at least two variables and applies them to linkages judiciously located in such a manner that the output will be indicative of the ratio of the sensed variable. In aircraft application a device of this type not only must be extremely accurate and reliable but also must operate in an environment where the device is subjected to different types of loadings that tend to affect the functioning and hence, accuracy thereof. For example, the sensing unit is subjected (1) to "G" loadings resulting from severe maneuvering of the aircraft, (2) to fluctuations resulting in changes in temperature, and (3) to varying changes in pressure as a result of varying altitudes.

It is therefore a purpose of this invention to provide a vector type of sensor as described that will operate and function accurately and reliably in an environment of the type described above.

A still further object of this invention is to provide a damping system for the sensing mechanism to prevent severe and untolerable vibrations resultng from the environment to which the sensor is subjected.

A still further object of this invention is to provide mechanism of the type described for mass balancing the entire sensing device so that inertia forces acting in any direction on the sensing device will have no influence thereon so that the resultant output signal will be accurately indicative of the ratio of the two sensed variables.

A still further object of this invention is to provide in a sensor as described means for assuring that the gain is constant throughout its entire operating range. Gain may be described as being that characteristic of the sensor wherein the same displacement for a given pressure ratio error signal will occur regardless of the pressure level to which it is being subjected. Thus, when the pressure is high at sea level, the sensor will move identically for a given pressure ratio deviation from the null position as it will be when the pressure is extremely low at a very high altitude.

A still further object of this invention is to provide a ratio sensor of the type described which is characterized as being highly reliable and accurate having a rapid time responsiveness and yet capable of being subjected to rugged and repeated use.

Other features and advantages will be apparent from the specification and claims and from the accompanying drawing which illustrate an embodiment of the invention.

Reference is now made to the sole figure depicting the preferred embodiment wherein the vector sensor is shown as it would be utilized as a controlling device responsive to certain jet engine operating parameters for producing a signal indicative of the ratio of the sensed parameters for controlling an actuator. The vector ratio sensor as understood in the context of this description serves to sense the inputs, produce an output, and control a stator vane, not shown, for a jet type of engine.

As can be seen from the sole figure, the sensor is best considered as comprising two major units, namely, the sensing and computing mechanism for producing a ratio output illustrated by reference numeral 10 and the null type of servo system 12 for obtaining sufficient forces for controlling, for example, a stator vane of a jet engine (not shown). Of course, as would be obvious to one skilled in the art, the sensing mechanism may be employed in other environments without departing from the scope of this invention. While the embodiment preferably shows the sensor and the servo mechanism to be enclosed in a single casing illustrated by numeral 14, it is obvious to one skilled in the art that both may be remotely mounted relative to each other.

Casing 14 carries an inner chamber defined by wall 16 which serves to form within the main housing cavity three chambers 18, 20 and 22. Sensing bellows 24 and 26 mounted in cavities 18 and 20 respectively constitute the major sensing mechanism. Both bellows 24 and 26 are constructed similarly and looking for the moment at bellows 24 it can be seen that there is an upper convoluted portion 30 and a lower convoluted portion 32 separated by header 34. Header 34 serves to define separate internal chambers within each of the bellows portions. In this particular application the upper portion 30 is evacuated in order to establish a zero reference pressure and the lower portion is subjected to one of the variable pressures intended to be measured and computed as will be described in more detail hereinbelow.

Bellows 26 is similarly constructed to bellows 24 having an upper convoluted portion 36 and a lower convoluted portion 38 separated by header 40. It will be noted that both ends of both bellows are grounded to the wall defining the cavities adjacent thereto.

Header 34 carries a centrally mounted downward projecting element 42 which has connected thereto link 44 whose other end flares out into a bifurcated section 46.

Likewise, header 40 carries a centrally mounted downward extending member 48 which has suitably secured thereto link 50 which also flares at its opposite end into bifurcated section 52. As can be viewed from the drawing, the width of the bifurcated section 52 is smaller than the internal width dimension of bifurcated section 46 so that it fits therein. Each bifurcated section has on its respective arms a pair of axially aligned openings for receiving rod 56 permitting each of the links 44 and 50 to rotate relative to each other. In the null position links 50 and 44 are preferably disposed at substantially right angles with respect to each other.

Suitably carried by the casing are rotatable rods 60 and 62 which are mounted in coincidence with respect to their centerlines and also in coincidence with the centerline of rod 56. The generally U-shaped linkage member 64 is secured to rods 60 and 62 and is rotatable therewith. U-shaped member 64 carries legs 66 and 68 extending downwardly to a transverse member 70. Member 70 carries a bifurcated section 72 extending normal thereto and has secured within the bifurcated portion link 74. The other end of link 74 is suitably mounted on rod 56 within the bifurcation portions of links 50 and 44. As will be described hereinbelow, this linkage member serves to impose a load, and together with the load produced by links 44 and 50, produces the ratio output of the variables being sensed. Spring 76 interconnects lever 78 extending from the U-shaped member 64 and rod 56 and keeps them in the null position while maintaining the links in tension. Valve stem 80 projecting into the main housing cavity is connected to the linkage system through flexure member 86 for positioning flapper 88 in accordance with a deviation from the null caused by the vector sensor. As schematically illustrated, the main housing cavity and the servo control section are sealed by virtue of sealing member 82 formed about stem 80.

The variables to be sensed then are fed to the sensor as fluid pressures wherein one of the variable pressures is admitted through conduit 90 to the housing cavity where it flows internally of bellows 26 and 32. The second variable being sensed is another fluid pressure admitted into the internal portion of bellows 36 through conduit 86. The fluid acting in bellows 26 then comprises the two variable pressures one of which acts in the lower convolute section 38 and the other acting in the upper convolute section 36. These pressures acting over the header 40 define a value indicative of the difference therebetween.

The pressure internally of the casing is also admitted into the lower convolute section 32 of bellows 24 where it acts against header 34 in opposition to the force created by the evacuated bellows section 30.

From the foregoing it is apparent that the two variable being sensed in this instance are a fluid pressure and a differential fluid pressure. The output which may be expressed in terms of $$\frac{P_1}{P_2-P_1}$$

will be indicative of the ratio of these two values. Movement of links 44 or 50 caused by a change in sensed pressures deviating from the value at the null position will cause the link 74 to pivot about axis 72 in a counter or clockwise direction depending on their values. This, in turn, causes the flexure member 86 to move axially for rotating the valve stem 80 about the junction point adjacent seal 82 in a corresponding direction. Flapper valve element 88 connected to valve stem 80 moves to or from the ends of the openings 94 and 96 of passageways 98 and 100 respectively serving to adjust servo pressure for actuating piston 102 which, in turn, actuates the cam lever 104 by virtue of connecting rod 106. As can be seen from the figure, high pressure fluid admitted into passage 108 eventually feeds lines 98 and 100 by way of pressure regulating valve 110 and line 112. The pressure regulating valve is of the in-line type and may be of any suitable type of pressure regulating valve. Since the pressure regulating valve does not form a part of the invention, a detailed description for the sake of convenience will be omitted. However, it may be pointed out that the valve maintains the pressure by sensing the pressure in line 100 on one end thereof and matching that pressure to a preselected force created by opposing spring 114. When the pressure deviates from the force of the spring, the valve portion will open or close adjusting the fluid pressure issuing from 108 into line 112.

A pair of spaced apart fixed restrictions 116 and 118 are inserted in lines 98 and 100 respectively and are in series with ports 94 and 96 respectively. Hence, when flappel valve element 88, for example, closes 96, the pressure drop across 118 increases and hence, the pressure in line 120 increases causing the pressure acting on the right-hand side of piston 102 to position the piston leftwardly and conversely when the flopper moves to the right closing off the end 94, the pressure across fixed restriction 116 increases causing the pressure in line 122 to increase, forcing piston 102 rightwardly. This, in turn, causes the cam lever 104 which is pivotally secured at 126 to rotate in either a clockwise or counterclockwise direction. The follower mechanism 128 responding to the motion of cam 104 causes pilot valve 130 to shift to either the left or to the right for issuing high pressure fluid admitted thereto through lines 108 and 132 to either flow through passages 134 or 136 depending on its particular direction movement which supplies fluid to a servo piston which, in turn, may be connected to drive a device intended to be controlled by the vector ratio sensor. Feedback is effectuated by the feedback follower 136' which rides along the rotating cam linkage 104 for positioning arm 138 which is rigidly connected to rotatable rod 60. Hence, upon movement of pilot lever 128 a signal is supplied to the actuator for controlling the output mechanism while simultaneously spring loaded lever 138 is rotated in a direction to counteract the initial rotation imparted to valve 80. This, in turn, restores the flapper valve element 88 back to its original null position relative to the openings 94 and 96.

In accordance with this invention provisions are provided to assure that the vector sensor is capable of repeated operation in an environment that is subjected to severe vibratory motions which can adversely affect its accuracy. Furthermore, such vibratory motions can prevail to the point where the structure comes into resonance and not only adversely affects the output signal but also can cause severe injury or destruction thereto. Accordingly, the vector sensor is designed to include a pair of cavities 150 and 152 which are both dimensioned larger in diameter than the diameters of the bellows disposed therein. Thus, an annular space or chamber is provided between the convolutes of the bellows and the inner walls of each of the respective cavities. Viscous fluid from reservoir 154 is admitted into these cavities through drill passageways 156 and 158 to surround the convolutes of the bellows and provide dampening thereof. Diaphragm 160 disposed in chamber 22 imposes a load acting on the fluid in the respective cavities 150 and 152 which load is created by pressurized fluid admitted through conduit 162. This serves to maintain the pressure of the dampening fluid acting in the cavity at a value that compensates for temperature variations to which said fluid is being subjected and also assures that no air pockets exist in the viscous fluid.

Also in accordance with this invention it is necessary to assure that the sensor is accurate and reliable notwithstanding the various loads to which the device is subjected. Such loadings include, for example, "G" loadings resulting from sudden and abrupt maneuvers of the aircraft. In accordance with this invention, therefore, the inertia forces acting on the linkages are balanced out by adding weight 170 to the bottom of linkage 74. The size of the weight is selected by trial and error so as to assure that when the device is subjected to various loads, the inertia of weight 170 will counteract the inertia of the linkage and bellows so that the net effect will be zero movement of the linkage mechanism.

It will also be noted that spring 76 is mounted to be over-center and hence adds a negative spring rate to the sensor. This negative spring rate serves to counteract the combined bellows and flapper valve spring rate. Hence, this provides a more sensitive sensor giving a larger displacement of member 86 for a change in pressure ratio.

It should be understood that the invention is not limited to the particular embodiment shown and described herein, but that various changes and modifications may be made without departing from the spirit or scope of this novel concept as defined by the following claims.

I claim:
1. In a vector ratio sensor of the type that includes angularly disposed linkages pivotally mounted to each other at one end, a reaction link attached to said pivot and sensing bellows attached to the other end of each of said angularly disposed linkages, the improvement comprising a casing enclosing said bellows, said pivot and said linkages, wall means defining with said casing spaced cavities for encasing said bellows, seal means sealing said cavities from the internal portion of said casing, dampening fluid completely filling said cavities and sealed therein and passage means intercommunicating said cavities.

2. In a vector ratio sensor as claimed in claim 1 including a resilient member continuously biased in one direction to maintain said cavities filled with dampening fluid and expandable to compensate for changes in temperature of said fluid.

3. In a vector ratio sensor as claimed in claim 1 including weight means attached to said angularly disposed linkage at said pivot and being of sufficient weight to mass balance the sensor so that when said sensor is subjected to an external force said linkages remain stationary.

References Cited
UNITED STATES PATENTS

| | | | |
|---|---|---|---|
| 2,434,794 | 1/1948 | Giesler | 92—41 |
| 3,162,047 | 12/1964 | Rosenberger | 73—388 |

S. CLEMENT SWISHER, *Acting Primary Examiner.*

DENIS E. CORR, *Assistant Examiner.*